May 4, 1943. J. G. SCOTT 2,318,532
REFRIGERATING SYSTEM AND APPARATUS
Filed Sept. 3, 1938 9 Sheets-Sheet 1

May 4, 1943.　　　　J. G. SCOTT　　　　2,318,532
REFRIGERATING SYSTEM AND APPARATUS
Filed Sept. 3, 1938　　　9 Sheets-Sheet 2

Inventor
James G. Scott
By Francis R. Leek,
Attorney

May 4, 1943. J. G. SCOTT 2,318,532
REFRIGERATING SYSTEM AND APPARATUS
Filed Sept. 3, 1938 9 Sheets-Sheet 3

Inventor
James G. Scott
By Francis B. Leech
Attorney

May 4, 1943. J. G. SCOTT 2,318,532
REFRIGERATING SYSTEM AND APPARATUS
Filed Sept. 3, 1938 9 Sheets-Sheet 5

INVENTOR
James G. Scott
BY Lloyd W. Batch
ATTORNEY

May 4, 1943.  J. G. SCOTT  2,318,532
REFRIGERATING SYSTEM AND APPARATUS
Filed Sept. 3, 1938  9 Sheets-Sheet 6

INVENTOR
James G. Scott
BY Lloyd W. Patch
ATTORNEY May 4, 1943. J. G. SCOTT 2,318,532

REFRIGERATING SYSTEM AND APPARATUS

Filed Sept. 3, 1938 9 Sheets-Sheet 7

INVENTOR
James G. Scott
BY Lloyd W. Gatch
ATTORNEY.

May 4, 1943. J. G. SCOTT 2,318,532
REFRIGERATING SYSTEM AND APPARATUS
Filed Sept. 3, 1938 9 Sheets-Sheet 9

INVENTOR
James G. Scott
BY Lloyd W. Patch
ATTORNEY

Patented May 4, 1943

2,318,532

UNITED STATES PATENT OFFICE 2,318,532

REFRIGERATING SYSTEM AND APPARATUS

James G. Scott, Washington, D. C.

Application September 3, 1938, Serial No. 228,433

15 Claims. (Cl. 62—99)

This invention relates to a refrigerating system and apparatus, and particularly to a structure of the character and nature disclosed and set forth and contemplated in my application Serial No. 561,069, filed September 3, 1931.

The primary object and purpose is to provide a refrigerating system and apparatus having and making use of a low temperature food or material freezing compartment and a distinct or separate food storage compartment to be maintained at a relatively higher temperature, the structure being such that the relatively different temperatures can be varied and can be maintained, as may be desired or requisite.

Another object is to provide a system and apparatus with which heat exchange can be controlled and is accomplished, in manner as may be desired for most efficient and economical use and operation.

Still another purpose is to provide apparatus and a system by which natural circulation is accomplished and such circulation can be directed or regulated or controlled to best suit the particular conditions of use.

A further object is to so construct and associate the parts that the heat absorbing unit is not directly subjected to likelihood of frosting due to moisture from food stuffs or other materials in the storage compartment.

Yet another purpose is to so construct the apparatus that parts thereof may be readily removed for defrosting, should occasion require, and for cleaning and deodorizing and sterilizing, for replacement, or for substitution of other like or similar parts.

A further purpose is to provide a system and apparatus adapted for use in a confined space and with which parts are arranged to take advantage of natural laws of circulation to thus maintain a substantially even temperature in all parts of the space or to attain and maintain differentials of temperature in various areas of the space, as may be desired.

Another object is to provide an improved system and apparatus that can be built into or can be embodied as a part of a refrigerator as employed in domestic dwellings, in stores, in cafes and restaurants, and in other places, and which will permit freezing of food stuffs and the maintenance of frozen foods and other materials in the frozen condition, as well as permitting maintenance of temperatures for unfrozen foods and other materials.

Still other and further objects are to embody the novel improvements and arrangements contemplated by this invention in such manner that they can be incorporated in domestic or household and other types of refrigerator apparatus, to produce a compact and artistic refrigerating box or container, and one which will be capable of incorporating and employing various heat absorption means or agencies, as a compression type of refrigeration mechanism, an absorption type of unit, or a natural or chemical refrigerant, such as solidified carbon dioxide.

With the above and other objects and purposes in view, some of which will be apparent to those skilled in the art, and others of which are inherent in the construction and use of the system and apparatus, my invention includes certain novel features of construction and combinations and arrangements of parts which will be hereinafter set forth in connection with the drawings and then pointed out in the claims.

The several sheets of drawings are intended to illustrate various embodiments and adaptations of my improved system and apparatus, and some modified adaptations of the system and the means.

In the drawings:

Fig. 18 is a view similar to Fig. 11 illustrating another embodiment.

More particularly in the drawings, I illustrates a refrigerating cabinet which is constructed in the general form of a conventional buffet. The cabinet is generally rectangular in shape and preferably constructed of sheet metal, having inner and outer spaced walls 2 and 3, the inner space being filled with suitable insulating material of cork, felt, asbestos wool and the like.

Figure 1:
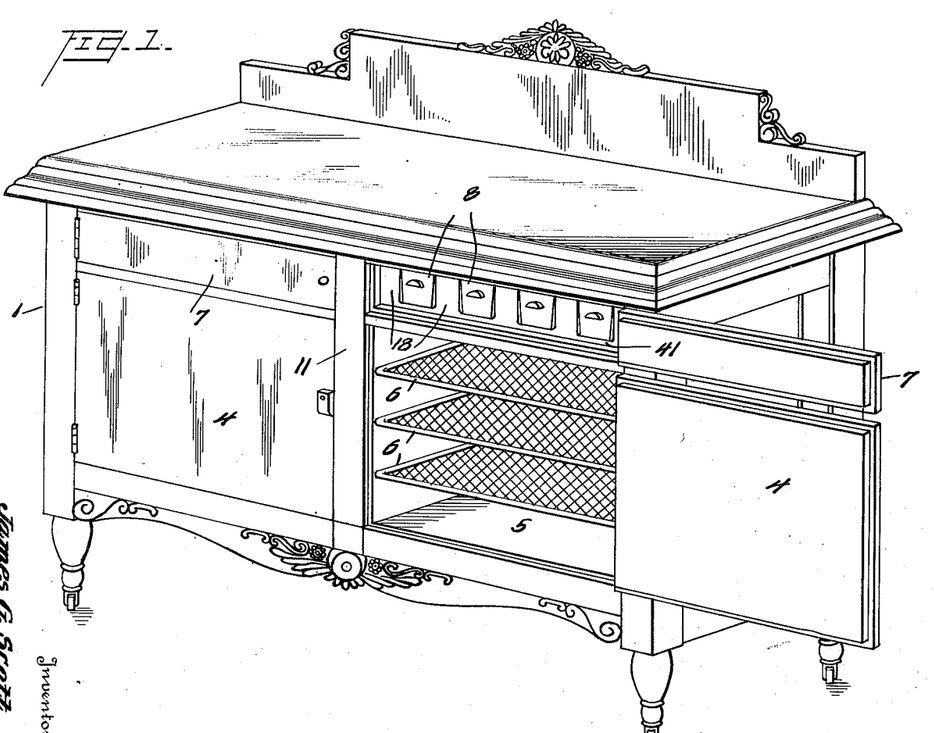
Figure 1 is a perspective view of a domestic refrigerator designed to have the general configuration of a buffet, and illustrating one embodiment of my system and apparatus.

In the front of the cabinet, large lower doors 4 are hung to provide easy access to the food compartment 5 wherein are mounted a plurality of food holding trays 6. Independently hung above the large doors 4 are smaller doors 7 which when open give access to the food freezing compartment, generally indicated at 8, and also expose to view the evaporator 9. As will be seen from Fig. 1, the exterior of the cabinet is ornamental and has a large top surface which can be utilized as a serving table or buffet. It will be noted that the cabinet is divided by central vertical partitions 10 and that the doors 4 and 7 abut the vertical post 11 when closed.

Thus it will be seen that individual doors are provided for the food compartments and the food freezing compartments and, as will be hereinafter described in detail, the food freezing compartment containing the freezing units is mounted in the upper portion of the cabinet and in spaced relation from the top and sides thereof so that a constant circulation of cold air penetrates every portion of the refrigerator.

Figure 3:
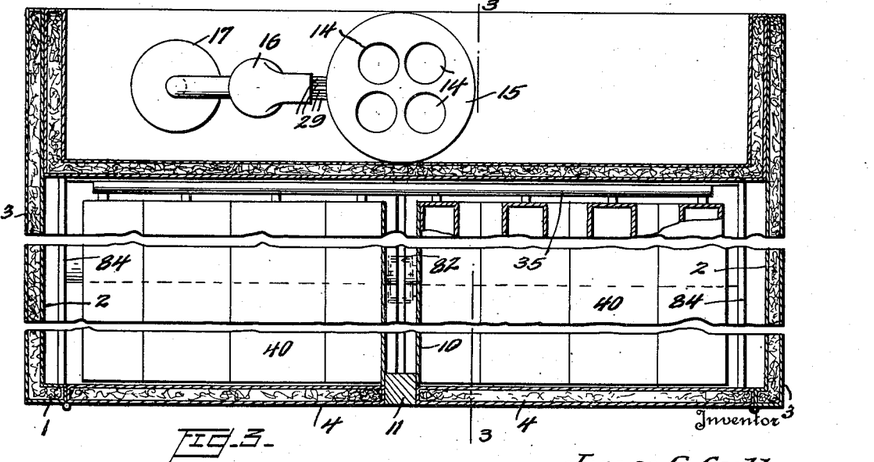
Fig. 3 is a horizontal view taken on line 2—2 of Fig. 2.
Figure 4:
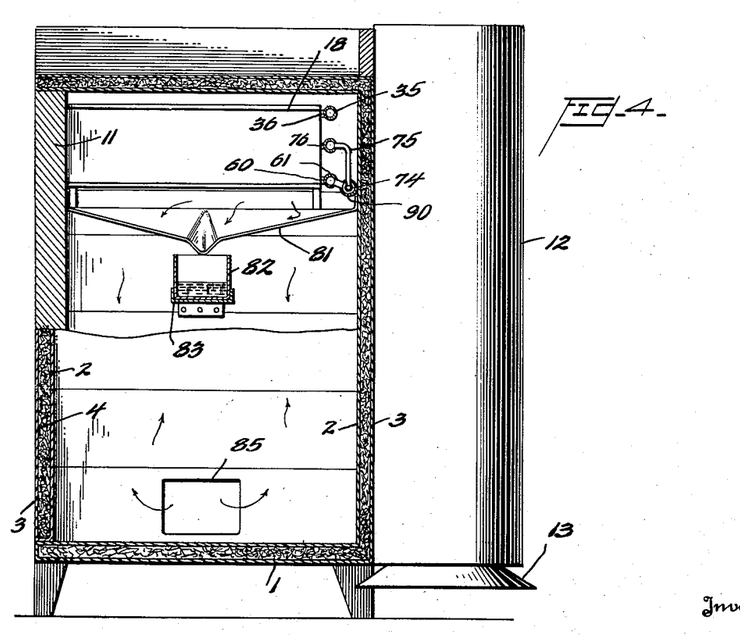
Fig. 4 is a vertical sectional view taken on line 3—3 of Fig. 3.

By referring to Figs. 3 and 4, it will be observed that the absorption refrigerating system is mounted directly behind the refrigerator box and is so placed that it is hidden from view by the extension of the side walls. The entire refrigerating unit is integrally attached to the refrigerator box and is in itself compact and self-contained, the only exterior connection necessary being an electric cable from the heating unit of the refrigerator to an electric floor plug.

Figures 5, 10:
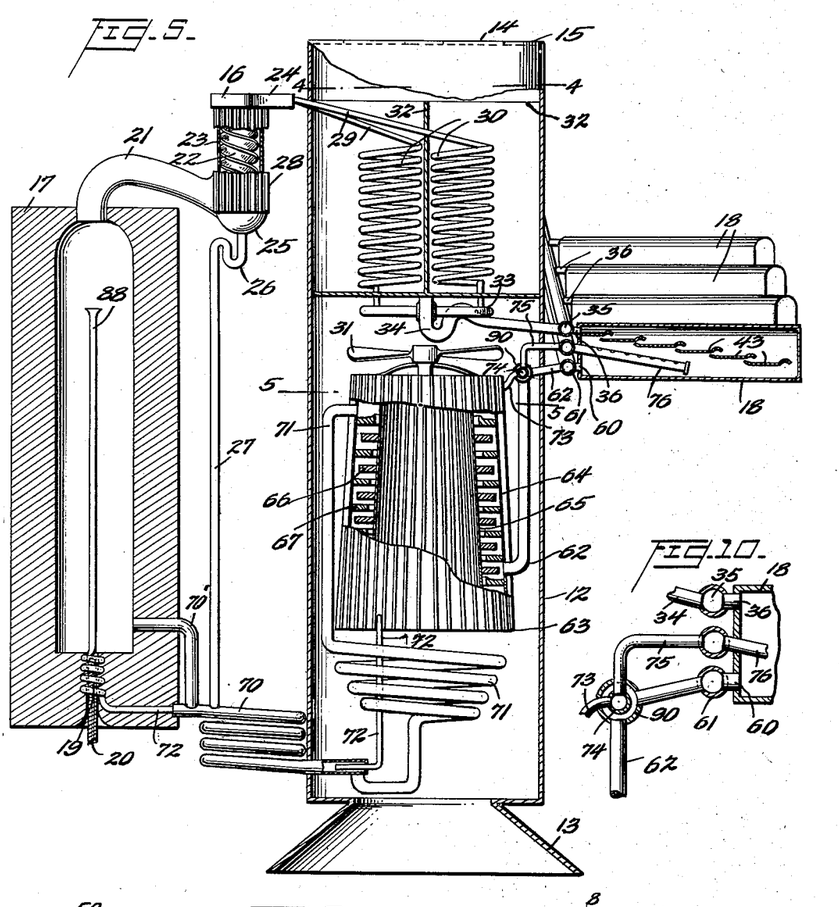
Fig. 5 is a schematic view of the absorption refrigerator system per se.
Figs. 8, 9 and 10 are detail views of the construction of one of the freezing units.
Figure 6:
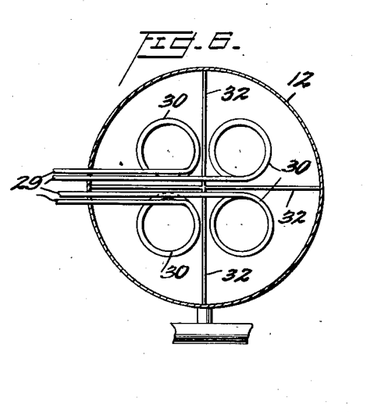
Fig. 6 is a sectional view taken on line 4—4 of Fig. 5.

In Fig. 5 is disclosed a partially cut away diagrammatic showing of the refrigerating unit per se. Numeral 12 denotes a vertical cylindrical casing which acts as an air conducting flue and this casing houses the majority of the mechanism employed. The lower portion of the casing or flue 12 is flared at 13 to increase the induction of air vertically through the casing and it will be understood that ascending air currents are created in the casing so that large quantities of cool air are drawn in through flare 13 and discharged through openings 14 formed in the top plate 15 of the casing. Mounted adjacent to the casing 12 and in a horizontal plane thereto is the rectifier or liquid trap 16 and vaporizer 17, while the freezing units or evaporators 18, which are mounted inside of the refrigerating box, are disposed at a 90° angle to the other mentioned apparatus. The details of construction of these portions of the mechanism will be described hereafter.

The general principle of operation of an absorption type refrigerator, on which the present invention is based, may be briefly stated as follows:

A soluble gas, which is normally in a vapor state at atmospheric or higher temperatures, such as ammonia, is dissolved in water to form a strong ammonia solution. The solution is heated and the free ammonia gas given off passed to a condenser where its latent heat is removed and the gas condensed to a liquid.

This ammonia liquid is run to an expansion chamber placed in the space to be cooled and the liquid permitted to evaporate and absorb the heat from the surrounding atmosphere while changing from a liquid to a gas. The gasified ammonia returns to the absorber and is again dissolved and condensed, after which the cycle is repeated.

While this is the genesis of the present system, it will be appreciated from the ensuing explanation that the fundamentals have been so modified and improved that a most efficient and practical apparatus has been evolved.

Into the heavy walled vaporizing chamber of generator 17 is introduced the requisite amount of ammonia and the generator is filled with water to the level of the interior standpipe 88. The anhydrous ammonia gas being extremely soluble in water, goes into solution with the water in the vessel and forms a strong ammoniacal liquor. Mounted in the bottom wall of the generator is an electrical resistance heater 19 supplied through conduit 20 from a conventional 110 volt household electrical light circuit. When the electric heater is energized, it imparts heat to the ammoniacal liquor contained in the vessel 17 and drives off from the water the dissolved ammonia. The ammonia gas thus liberated ascends and is conducted from the generator through pipe 21 to trap or rectifier 16. The gas enters the rectifier near the lower portion there and ascends between the spiral 22 and side walls 23 to a header 24. The action of this trap or rectifier is to remove from the vapor any entrained water vapor and the spiral 22 acts as a baffle to remove this water vapor which gravitates into the collection chamber 25 formed in the bottom of the trap and after passing U-shaped liquid seal 26 descends through pipe 27. This condensed water vapor is in the form of a weak ammonia liquid and it is returned to the system as will be hereinafter described.

It is preferable to form the outer vertical casing of the rectifier 16 with corrugations 28 so that a large air surface is presented to assist in the condensing of the water vapor carried by the ammonia gas.

The ammonia gas from header 24 passes from the same through a plurality of pipes 29 which are the upper ends of the coils 30. It will be seen that these coils 30 are mounted in the upper portion of the vertical casing or flue 12 and directly above air fan 31 which is so mounted as to direct a blast of cold air in an upward direction in full contact with the heat exchange coils or condenser 30. To assist in the even distribution of the air blast created by fan 31, the casing surrounding the coils 30 is transversely divided by vertical partitions 32.

The lower ends of the coils 30 discharge into a common conduit 33 and thence to the freezing unit or evaporator.

The large volume of air which is directed against the condensing coils 30 is drawn from the bottom of the casing through flare opening 13 and the opening 13 being positioned close to the floor of the room in which the refrigerator is installed collects the cool air which is found in this portion of a room. The air having been drawn from the adjacent floor passes over a portion of the apparatus, to be hereinafter described, which is kept cool from the discharge of the freezing coils and, consequently, the temperature of the ascending air is considerably lowered. Thus it will be seen that the blast of air directed against the coils 30 by the fan 31 is sufficiently cool to absorb the heat of expansion in the ammonia gas which is descending in a counter-current to the air blast and, as the heat in the gas is absorbed, its physical condition changes from a gas to a liquid.

The liquid ammonia collects in common conduit 33 and thence to pipe 34 which feeds the liquid to horizontal header 35 which, in turn, feeds each individual freezing unit 18 by means of outlet pipes 36.

Figure 2:
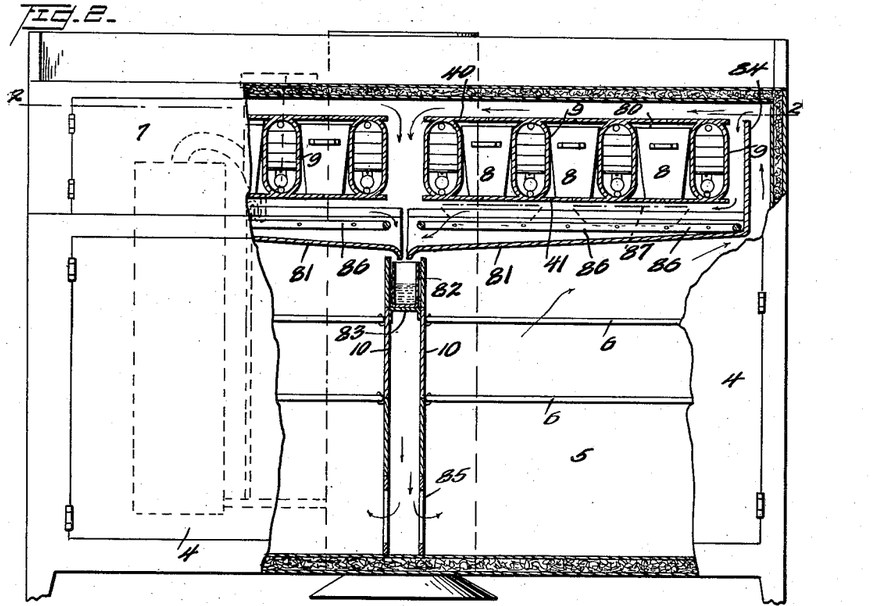
Fig. 2 is a partially broken away front elevational view.

The individual freezing units 18 are composed of horizontal compartments with their top and bottom walls elliptical in shape. It is preferable to weld the tops of a series of these freezing units to top plate 40 and to a bottom plate 41 so as to provide large cooled plane surfaces and to thermally couple the freezing units together. This construction is illustrated in Fig. 2 of the drawings, and shows the horizontal evaporators in multiple.

As before stated, each freezing unit 18 is fed with liquefied ammonia from header 35 and feed pipe 36. The feed pipe 36 being in communication with the freezing units at a point near the top of the receptacle or unit and transversely positioned in the unit are a plurality of progressively descending baffle plates 43 to provide large surfaces for incoming liquefied ammonia and over which the ammonia flows to expose considerable quantities thereof and thus insure rapid vaporization of the liquid.

Figure 8:
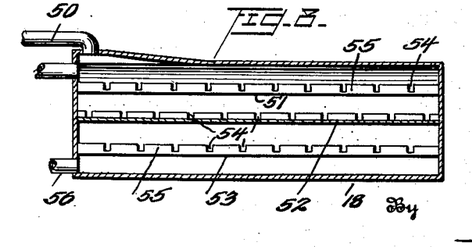
Figure 9:
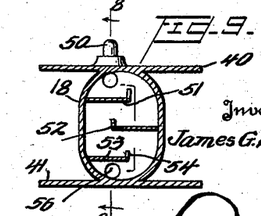

In Figs. 8 and 9 of the drawings is disclosed a modified form of the freezing unit or evaporator wherein the incoming ammonia liquid is fed into the casing of the unit through inlet pipe 50. The liquid spreads out over the longitudinal baffle plate 51 and drips down to lower baffle plates 52 and 53 through slots 54 formed in the upstanding side wall 55 of the baffle plate. As shown in Fig. 9, these baffle plates extend throughout the longitudinal length of the unit and are mounted in alternate relationship to the side walls of the unit so that the ammonia liquid travels a considerable distance during its vaporization. The gasified ammonia passes out of the unit through bottom pipe 56. Units constructed in accordance with the disclosure in Figs. 8 and 9 are mounted in a manner similar to units 18 heretofore described.

It is preferable, though not essential, to introduce hydrogen gas into the units simultaneously with the introduction of the liquefied ammonia and to allow the hydrogen gas to become diffused with the ammonia gas as it is evolved during its transition from a liquid to a gas. It is a well known fact that the introduction of the inert hydrogen gas permits of a uniform diffusion of the two gases and to thus create a more efficient absorption of heat units from the atmosphere surrounding the freezing units. The mixture of hydrogen and ammonia gases has a higher specific gravity than either of the gases alone and, consequently, their exhaustion from the freezing units is accelerated.

Positioned in the lower portion of the freezing unit is an exhaust pipe 60 which communicates with a horizontal exhaust header 61 which in turn is connected to pipe 62 in communication with an absorber 63.

The absorber consists of concentric tapered shells 64 and 65 and in the space between the inner and outer shells are mounted alternate circular baffles 66 and 67 which present a tortuous path to the gas mixture entering between the shells through pipe 62. This gas inlet pipe is mounted in the lower portion of the absorber a short distance above the bottom wall thereof.

As has been previously pointed out, the ammonia gas generated in the vaporizer 17 passes upward through a trap or rectifier 16 wherein any entrained water vapor is segregated. The water vapor condenses into liquid and flows downward through pipe 27 into coil 70. This coil 70 is composed of several turns of fairly large diameter pipe and interiorly spaced from its side walls is pipe 72 which leads from the bottom of absorber 66. Thus a heat exchange occurs in double walled coil 70 by reason of the countercurrent of weak ammonia liquid flowing from the bottom of the generator 17 through pipe 70', coil 70, air cooled coil 71 and thence to absorber 63. This weak ammonia liquid is naturally warm when it comes from the generator while the strong ammonia flowing from the absorber 65 through pipe 72 is quite cold and consequently the strong liquid cools the weak liquid. The strong ammonia liquor leads into standpipe 88 positioned in the center of the generator 17.

Further cooling of both pipes 71 and 72 is accomplished by having them so positioned in the lower portion of the casing 12 that they are exposed to the slip stream of air ascending in the casing induced by rotation of the fan 31. The outer end of heat exchange coil 71 is connected above the topmost baffle mounted in the absorber 63 and the fluid, which is in reality a weak ammonia water, trickles downwardly over the series of baffles 66 and 67 in a counter path to the mixture of ammonia and hydrogen gases introduced to the absorber through pipe 62.

As the weak ammonia water descends in the absorber, the descending ammonia gas goes into solution with the weak ammonia water to form a strong ammonia water which is removed from the absorber through pipe 72 connected to a point in the lowermost portion of the absorber and directly above the bottom well thereof.

Figure 7:
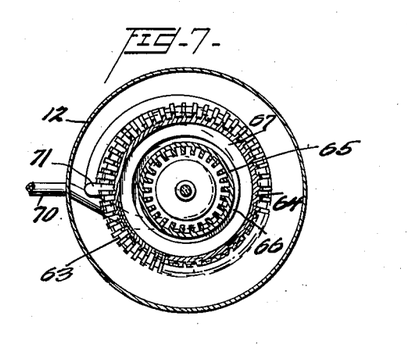
Fig. 7 is a sectional view taken on line 5—5 of Fig. 5.

The strong ammoniacal liquor passing downwardly through pipe 72 is quite cold, inasmuch as during the period of its passage through the absorber it has had a large amount of its latent heat removed by the air passing through the casing 12. This heat exchange is augmented by providing vertical corrugations in the inner and outer concentric shells of the absorber. These corrugations, together with the vertical air passage, are shown in detail in Fig. 7.

The hydrogen gas, which is diffused with the ammonia gas, is not dissolved in the water trickling down through the absorber and, consequently, it being very light passes out of the absorber through upper pipe 73 and into the horizontal header 74 and thence to the several pipes 75 each of which leads to a separate freezing unit or evaporator. Attached to inlet pipe 75, interiorly of the freezing unit, is an extension or nozzle 76 provided with a plurality of perforations through which the hydrogen gas escapes and passing upwardly strikes the under side of the baffles 43 which being slightly spaced apart allow the hydrogen to percolate through the liquid ammonia and readily diffuse. A detailed view of the piping connected to each freezing unit is disclosed in Fig. 10.

This ammonia-hydrogen cycle wherein the diffusion is well known to those skilled in the art and its use creates a positive circulation of the refrigerant gas and at the same time, while no true chemical reaction takes place, the gases are closely admixed. However, when the gases pass from the evaporator to the absorber, the ammonia is absorbed by the weak liquor while the hydrogen continues to circulate from the top of the absorber through the evaporator.

There is also an exchange of heat units between the outgoing ammonia gas and the incoming hydrogen. The hydrogen, as before noted, leaves the absorber through upper pipe 73 which is connected to header 74 from which the individual freezing units are supplied through pipes 75. Concentrically mounted around header 74 is outlet manifold 90 into which the several exhaust gas pipes 76 empty and, consequently, the cold expanded ammonia gas absorbs heat from the incoming hydrogen gas and, as is well known, the lower the temperature of the hydrogen, the more complete is the diffusion of the two gases in the freezing unit.

Thus it will be seen that the refrigerator cabinet is provided with a plurality of freezing units and, as previously stated, the several units are coupled into a series by upper and lower plates 40 and 41. Between each two freezing units there is placed a sliding horizontal ice tray 80 to permit a large amount of ice to be frozen simultaneously with the refrigeration of the cabinet.

It is preferable, as disclosed in Figs. 1, 2, 3 and 4 of the drawings, to so construct the refrigerating cabinet that a positive circulation of cold air is generated for cooling the food compartments. In the drawings referred to, the evaporator or freezing units are mounted at the top of the upper or food freezing compartment and, as before described, access is provided to the units and ice trays through doors 7.

For practical purposes, the refrigerator is divided into two major compartments, separated by post 11, each having individual doors 4. Attached to the sides of the post 11 are vertical walls 10 which extend to the rear of the compartment and, as both the right and left side compartments are identical, it will only be necessary to describe one compartment. Positioned directly beneath the series of freezing units is a combined baffle and sloping drip pan 81 which slopes towards the center of the refrigerator and the drip occasioned by the defrosting of the refrigerating unit is caught by the receptacle 82 held between the walls 10 by the bracket 83. The horizontal baffles 81 underlie each series of freezing units and it is preferable to extend their opposite ends to form a vertical baffle 84. This baffle extends upwardly to the height of the horizontal plate 40 connecting the series of units and is spaced therefrom so as to form an air passage.

For practical purposes, the refrigerator may be divided into two sections separated by post 12 and an appropriate partition, each section having individual doors. In the present instance I have illustrated the partitions 10 as forming the extensions of post 11, and the wall of the compartment. The internal arrangement of the refrigerator is such that an upper or food freezing compartment is separated from the lower or general food storage compartment 5 by the baffle wall 81, this baffle forming the base or lower portion of a food freezing storage compartment and the top or upper restriction of this storage compartment constituting or being composed of the ice mold tray assembly and the horizontal walls, together with the associated parts. A circulatory air action is set up within the food freezing storage compartment by the vent opening formed by the arrangement of the vertical extension of baffle 81, and the corresponding formation and disposition of the ice mold tray assembly. A vent is formed at the opposite end of the ice mold tray assembly, and these vents induce circulation of air within the freezing compartment and within the lower storage compartment. This circulation is the result of the thermo-syphonic action effected by the relatively low temperature of the upper compartment and its contents, and the heat absorption continually causes a circulation of air through the various parts of the refrigerator, the baffle arrangement however retarding and limiting this circulation to predetermined paths to thus maintain the relative difference in temperature in the two compartments.

As indicated by the arrows in Figs. 2 and 4, the positive circulation of cold air is secured by thermo-syphonic action and, as the air in the compartment is chilled by contact with the freezing units, it passes downwardly between the series and between the baffle plate 34 and the units, between the walls 10 and outwardly into each compartment through openings 85 cut in each wall 10 adjacent the bottom of the compartment. After passing upwardly through the compartment and absorbing some heat from the food on the shelves 6, it is directed by the sloping drip pan 81 towards the sides of the receptacle and is again directed in its course by vertical baffle 84 and this cycle of circulation is continued until all of the air in the whole compartment has been lowered in temperature equal to that in the freezing units.

Inasmuch as it is sometimes advantageous to quickly cool food or prepare frozen desserts, a rack 86 is positioned directly beneath the lower plate 41 and directly above drip pan 81. As indicated by dotted lines, dishes 87, containing foods to be quickly frozen or cooled, are placed on these racks 86 and, consequently, they receive a large amount of cold from the freezing units and also from the current of air which passes above and below them as they are in the direct path of the cooled circulating air. Foods to be kept in a frozen condition may be placed on the rack 86 and maintained at lower temperature.

In the embodiment as above described, reference has been made to an absorption type of refrigerator or heat exchange means, used in conjunction with a specially constructed refrigerating cabinet, and it is to be understood that the principles thus disclosed as involved in conjunction with the absorption heat exchange means and system may be constructed in units adapted to any ice box or refrigerating cabinet now in use, irrespective of whether the heat exchange means or agency may be of the compression or absorption type, or of evaporative or subliming character; and, in connection with this embodiment and the others to be hereinafter more fully described, it is to be understood and appreciated that the heat absorbing means or agency may be of any desired type and character, suitable for the particular conditions of use.

Figure 11:
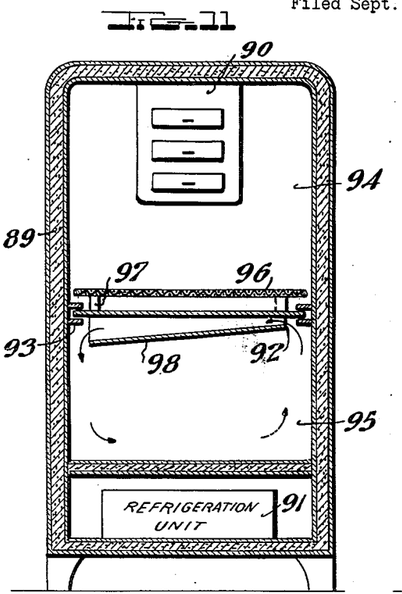
Fig. 11 is a view somewhat similar to Fig. 2 illustrating another embodiment of my invention.

With the adaptation of my invention illustrated in Fig. 11, the cabinet structure 89 is of more or less conventional household type, and is fitted with a refrigerating structure of the compressor type, the evaporator being indicated at 90 and the cooler and compressor structure being generally indicated at 91. Within the chamber of the cabinet, and below and out of contact with the evaporator or heat exchange unit 90, I provide a transverse baffle 92, which can be fitted to slide into guideways 93, so that the baffle wall 92 is thus disposed substantially transversely across within the chamber of the cabinet in approximately horizontal plane to thus divide the chamber into an upper freezing compartment at 94 and a lower food storage compartment at 95. The baffle wall 92 is fitted in such manner that when the usual door of the cabinet is closed the upper compartment will be substantially separated and divided off from the lower compartment, and thus there is no circulation of air between or from the two compartments. The baffle wall 92 serves to cool the food storage compartment 95 by conduction of heat, and the absorber or refrigerating structure 90 within the freezing compartment 94 serves to keep the temperature within this compartment relatively considerably lower than the temperature in the compartment 95. With the temperature in compartment 94 reduced to or below freezing, it has been found that the temperature within the food storage compartment 95 is maintained above freezing, and that all tendency to frost upon surfaces within the food storage compartment 95 is overcome. Therefore, with no frosting, there is no tendency to extract moisture from or dehydrate green vegetables, or other foodstuffs or other materials contained within the storage compartment 95.

By providing a compressor 91, or other refrigerating unit, of sufficient capacity, the evaporator 90 can be made to maintain a temperature within the food freezing compartment 94 at or below freezing, suitable refrigerants for such a system now being already known and available and thus it is not only possible to preserve the condition of frozen foods within this compartment 94 but foods and other materials can be frozen and can then be maintained or retained in frozen condition. While I have in the present instance indicated the evaporator 90 as being provided with openings for the usual ice mold trays, it will be appreciated that with this construction it will be possible to freeze water or other liquids at substantially any location within the freezing compartment 94.

It has been ascertained that if ice mold trays of foodstuffs or other material to be frozen, or, to be maintained in a frozen condition, be placed or set to rest directly upon the baffle wall 92, there will result heat conduction to raise the contacting portion of the material or article or structure containing this baffle wall plate 92, and I therefore provide a grill or rest 96 to receive and support food stuffs, and the like, within the compartment 94, and positively out of contact with the baffle wall member 92. In the present instance I illustrate the rest or rack 96 as supported upon insulating legs 97, to thus obviate heat transfer, but quite obviously other expedients might be resorted to in insulating or holding or supporting food stuffs and the like within the freezing compartment 94 out of thermal conducting contact with the baffle wall member 92.

A uniform temperature can be attained and maintained within the food storage compartment 95 to best advantage if air be circulated therein and in manner to contact with the under side of the baffle wall plate 92, and I therefore provide an air circulating plate 98, disposed beneath and in inclined relation with respect to the baffle wall member 92. With this inclined air circulating wall, it has been found that the air within the food storage compartment 95 is circulated substantially in the direction indicated by the arrows, and this causes attainment and maintenance of a more uniform temperature in all parts of the food storage compartment.

Figure 12:
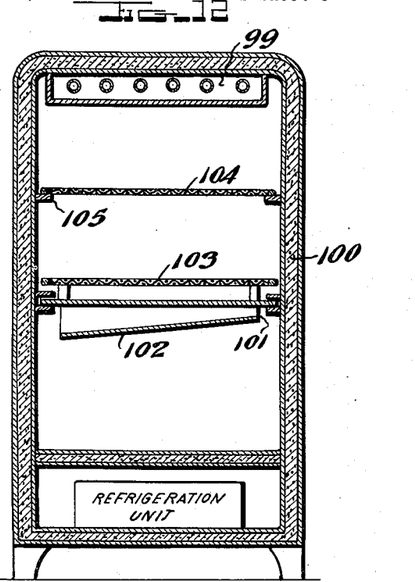
Fig. 12 shows another modified construction.

With the structure illustrated in Fig. 12, an evaporator or heat exchange structure is provided at 99, in the top of the compartment of the cabinet 100, and a horizontal baffle wall 101 serves as a partition dividing the cabinet space into an upper freezing compartment and a lower food storage compartment. This baffle wall member 101 has an inclined air circulating wall 102 on the lower side thereof, and a supporting rest or rack 103 is provided within the freezing compartment to hold food stuffs and other materials out of contact with the baffle wall member. As shown, one or more shelves or rests or grills 104 can be provided within the upper freezing compartment, to be supported by rests 105, or in any other suitable manner. In this way, the shelf space made available within the freezing compartment is materially increased, and foodstuffs and the like are completely separated from contact, or possible contact, with the baffle wall member 101. Under some circumstances it may be found desirable or advantageous to dispense with the support or rest 103 and to employ one or more valves or rests or grills 104.

Figure 13:
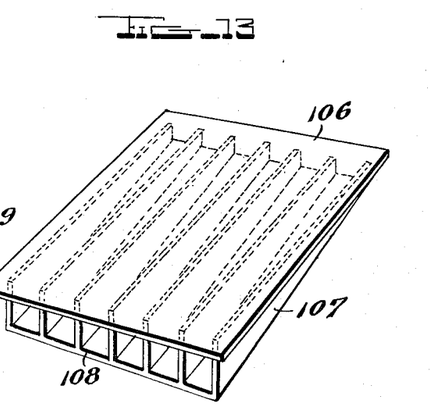
Fig. 13 is a perspective view to better show the distributing baffle plate disclosed in Figs. 11 and 12.

In Fig. 13 I have illustrated one form that the baffle wall member and the circulating plate structure can take, and in this disclosure, the baffle wall member 106 has a plurality of tapered spaced fins 107 extending therefrom to the circulating plate 108. These fins form and provide a plurality of air conducting ducts to direct the flow of air, with the fins at the same time very appreciably increasing the heat absorption surfaces. Obviously, the baffle wall member 106 can be employed as either the baffle wall member 92 or 101; and, it will also be apparent that a baffle wall member might be substituted in place and instead of the rest or support 104, or two or more baffle walls can be employed at such elevations and in such places and spacing as may be found desirable. Where two or more baffle walls are employed, this will permit accomplishment and maintenance of three or more different temperature zones, and the inclined circulating wall portion will in each instance cause circulation of air in the respective compartment or space to attain and maintain a more uniform temperature.

In Figs. 14, 15, 16 and 17, I have illustrated a somewhat different form of heat exchange structure, in the upper freezing compartment 109 of the space within the cabinet 110. In this adaptation, evaporator coils 111 are disposed within containers 112, these containers being filled with alcohol or other suitable non-freezing heat exchange liquid and being sealed. The containers 112 are disposed substantially flatwise against the side walls within the compartment 109, and their exposed outer walls 113 are preferably made substantially flat. Plates 114 are provided to fit in contact with these flat sides 113 in heat conducting relation, and thus heat is absorbed through these plates 114, through the side of the container 112, and through the liquid to the coils 111. As the plates 114 are intended and designed to coop the compartment 109 by conduction, it is desirable that the air within this compartment be circulated adjacent to the plates 114, and air circulating plates 115 are provided to aid in inducing a natural and speeded up circulation of air. As is perhaps best shown in Fig. 14, these air circulation plates 115 are associated with the plates 113 in spaced relation with the plates 115 somewhat inclined so that the space increases toward the bottom. A plurality of tapered fin plates 116 is provided between the removable heat exchange plate 114 and the air circulating plate 115, so that conduction to the plte 115 is directly established and the heat absorbing surfaces as presented are considerably increased. As the warmer air is taken in at the top into the space between the plates 114 and 115, this air will be cooled through heat extraction contact with the container 112, and the chilled air will drop by natural gravity flow to discharge from between the plates 114 and 115, and to then flow out into the space of the freezing compartment 109. Rests 117 and 118 can be provided on the air circulation plate 115 to receive and support rests or racks 119, or ice mold trays or other containers, so that a direct metallic heat conducting contact is established.

Figure 14:
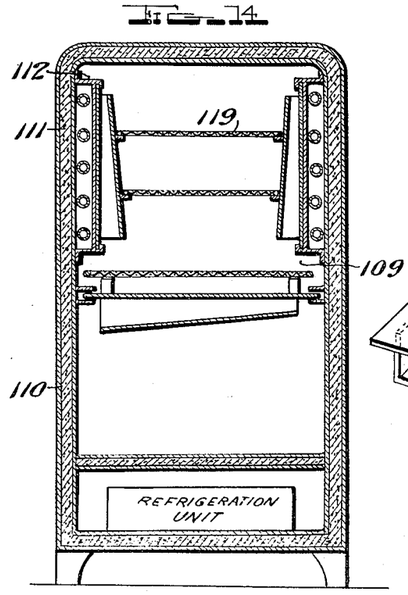
Fig. 14 is a view similar to Fig. 11 disclosing another modification.
Figures 15, 16, 17, 25:
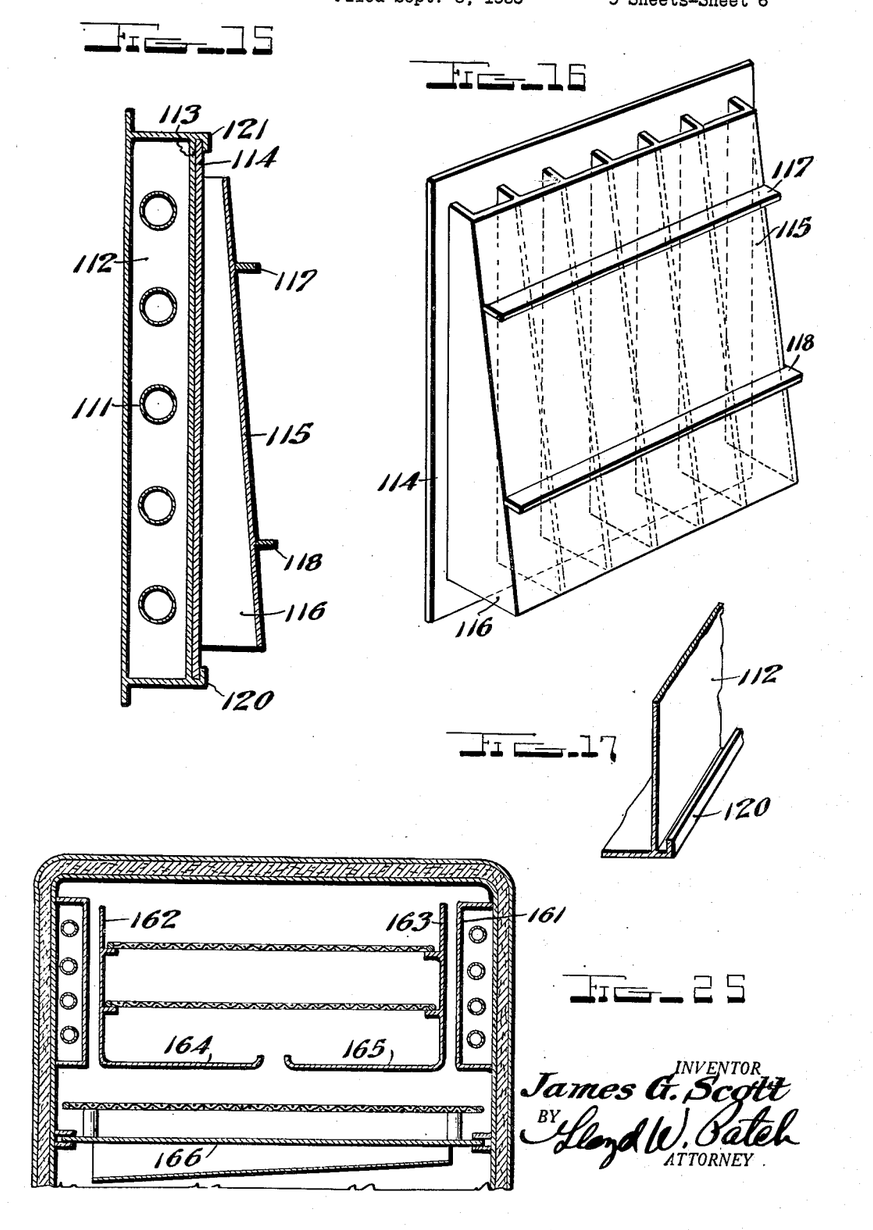
Fig. 15 is an enlarged fragmentary view to better show the circulating baffle means of the disclosure of Fig. 14.
Fig. 16 is a perspective view illustrating the distributor baffle means.
Fig. 17 is a fragmentary perspective view showing the distributor baffle plate retaining slide guideway.
Fig. 25 is a fragmentary view similar to Fig. 2 showing a modified embodiment.

Guide slideways 120 and 121 are provided on the containers 112 to receive and hold the heat conduction plates 114, and the various parts carried thereby, so that when the door of the refrigerator is opened this heat conductor plate 114 can be readily and conveniently slid forward to be entirely removed so that the plate can be defrosted, can be washed or cleaned or sterilized, and then can be replaced. Or, a new and clean plate can be inserted in substitution for the plate 114, as removed. With this assemblage, it is possible to remove the heat absorption and air circulation plate structure for defrosting or for any other purpose, and to insert a new assembly, without stopping the refrigerating operation, and with only minimum time required for opening the refrigerator door to have access to the parts being removed and replaced.

In the adaptation shown in Fig. 18, the cabinet structure 121 has a baffle wall member 112 extending substantially vertically therein and dividing the container space into a freezing compartment 123 and a container compartment 124. The freezing compartment 123 has a tank or container 125 along one side thereof, with heat exchange coils 126 within this container, so that the possibility of frosting is obviated or reduced to a minimum. A heat conduction plate 127 has an air circulating plate 128 carried thereby, in manner somewhat similar to the association of the plates 114 and 115, and this structure can be removably assembled after the manner hereinbefore set forth. With this construction, the warmer air in the top of the compartment 123 is received at the top between the plates 127 and 128, to be cooled and to drop by natural gravity flow to establish circulation of air within the compartment 123. On the side of the baffle wall member 122 within the compartment 124, I preferably provide an air circulating plate or wall 129, which is preferably inclined or opened outwardly toward its lower edge to thus attain and maintain circulation of air within the food storage compartment 124.

Figure 19:
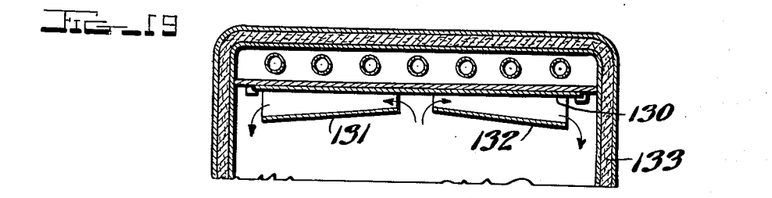
Figs. 19, 20 and 21 are fragmentary views illustrating other arrangements of circulating baffle means.

In some instances it may be found desirable to accomplish a circulation of air inwardly or outwardly in two or more directions, and in Fig. 19 I disclose an adaptation suitable for such accomplishment. The baffle wall plate member 130 has two air circulating wall members 131 and 132 carried and spaced from the under side thereof, with two air circulating plates spaced apart in the middle area of the baffle plate member 130 and then inclined downwardly toward and stopped short of the sides of the cabinet structure 133. With this construction, the heated air in the cabinet will rise to circulate in substantially the manner indicated by the arrows, the heated air entering at the restricted edges of the air circulating plates 131 and 132, substantially in the middle at the top of the compartment, and being circulated to be cooled by conduction through the baffle wall plate and the air circulating plate and any thin members or portions connecting the same, so that the cooled air rolls or drops down over the downwardly inclined upper faces of the walls 131 and 132 to be discharged, substantially as indicated by the arrows, near the top of the compartment and adjacent to the side walls of the cabinet. As the side walls will ordinarily be or bound the warmest section of the container or compartment space, this discharge of cold air to drop down along the side walls may be found quite efficient.

Figure 20:
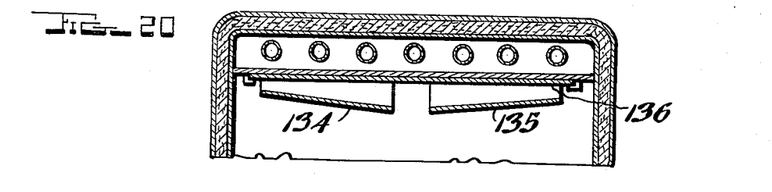

With the embodiment illustrated in Fig. 20, the air circulating wall members 134 and 135 are substantially reversed in their inclination with respect to the baffle wall member 136, and in this adaptation the circulation of the air within the container or compartment space will be substantially reversed, as indicated by the arrows, so that the warm air will rise adjacent to the side walls of the cabinet structure and will be cooled and then discharged substantially into the middle and at the top of the container or compartment space.

Figure 21:
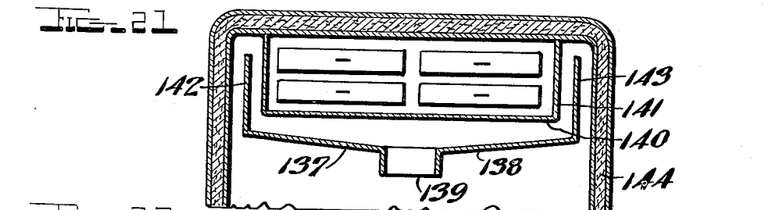

Fig. 21 illustrates still another embodiment in which the air circulating wall members 137 and 138 are made substantially continuous and are inclined toward a center to terminate in an air discharge flue 139. In this instance the baffle wall member 140 is provided with side wall portions 141, and the air circulating wall members 137 and 138 have upwardly disposed extensions 142 and 143 which rise around and are spaced from the side wall portions 141 of the baffle wall member 140, these extensions 142 and 143 being spaced from the inner faces of the side walls and the top wall of the cabinet structure 144. With this construction, the circulation and the course of air will be substantially as indicated by the arrows.

Figure 22:
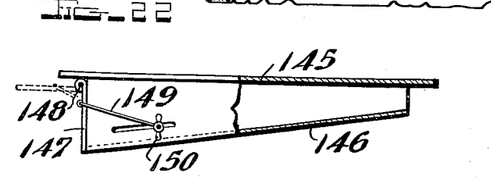
Figs. 22 and 23 are fragmentary sectional views showing adjustable circulation control means.

At times it may be desirable to control and perhaps retard the discharge of circulation of air between the baffle wall member and the air circulation plate, and in Fig. 22 I have illustrated one form of means suitable for accomplishing this purpose. As here shown, the baffle wall member 145 has the air circulating plate 146 associated therewith in substantially the manner set forth above, and at one of the open ends a damper 147 is hinged, as at 148, or is otherwise suitably mounted to be swung to one position to close the space between the plates 145 and 146 to the circulation of air, and to be opened out to any desired degree and extent to control and vary the circulation of air. A damper control rod 149 is here shown as a means of manipulation with a set screw 150 serving to anchor this draft control rod to thus maintain or hold the damper 147 in desired adjusted positions.

Figure 23:
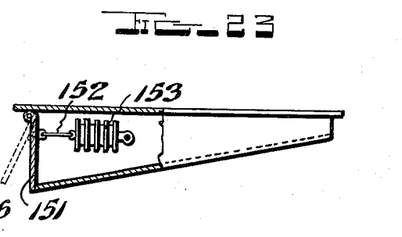

As illustrated in Fig. 23, the damper 151 is adapted to be automatically controlled by temperature conditions, and in this instance the draft control rod 152 is connected with an expansible bellows 153, or with other thermostatically actuated operating means so that the damper will be actuated and will be set by varying temperature conditions. Obviously, the thermostatically actuated damper operating means can be placed at any desired point within the compartment or container to be cooled.

It has been found that the circulation of air is speeded by increasing the angle of inclination of the air circulating plate, and that circulation is retarded by decreasing the angle of disposition so that the circulating plate is brought more nearly into a plane parallel with the baffle wall plate member, and it is to be understood that the angle at which the air circulating plate is disposed can and will be varied and regulated accordingly.

Figure 24:
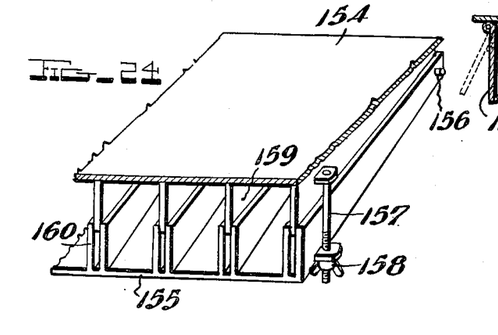
Fig. 24 is a fragmentary perspective view illustrating an adjustable circulating baffle means.

In Fig. 24 I illustrate an adaptation in which the angularity of the plate is adjustable, and as here shown, the baffle wall member 154 has an air circulation plate member 155 hingedly or swingably connected at one end in spaced relation with respect thereto, as by a hinge pin 156 or other suitable means. With this arrangement the air circulating plate 155 can be swung up or down at its free end to vary the angle of inclination, and any suitable means can be provided to set and hold the air circulating plate in the desired adjustment. In the present instance I have shown an adjusting screw or bolt 157 associated with one plate and an adjusting nut 158 on this screw or bolt to maintain adjustments.

As has been previously explained, it is desirable that thermal conducting contact be established and maintained from the baffle plate member 154 to the air circulating plate member 155 and in the present instance I provide single fins 159 on the inner side of the plate 154 and double fins 160 on the upper side of the swingable air circulating plate 155. The fin blades are of course suitably tapered, and the single blades interfit between the double blades in such manner that the plate 155 can be adjusted as may be desired, but at the same time the thermal conducting contact and connection is at all times maintained between the plate 155 and the plate 154. Obviously, other expansible connections and expedients can and may be resorted to to accomplish a thermal conducting connection and yet permit swinging and consequently angular adjustment of the air circulating plate.

With the modified adaptation illustrated in Fig. 25, the containers 161 are quite similar to the parts in the disclosure in Fig 14, and the air circulating plates 162 and 163 may be constructed and mounted substantially after the manner of plates 115. These air circulating plates 162 and 163 have at their lower edges inturned deflecting plates or flanges 164 and 165 which extend inwardly in opposed relation and are stopped in spaced relation at their inner ends to thus provide an air circulating and discharge space. With this construction, the course of circulation of chilled air is substantially as indicated by the arrows, and the air having the heat extracted by the containers 161, and the refrigerating coils thereof, will be conducted over and in contact with the upper face of the baffle wall member 166.

Figure 26:
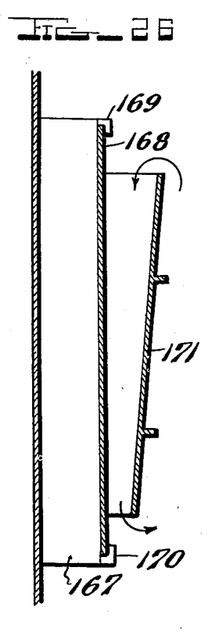
Fig. 26 is a view similar to Fig. 15 showing a modified construction.

In the adaptation illustrated in Fig. 26, the heat exchange structure 167 can be of the type illustrated in Fig. 15, or of any other type or construction, and the plate 168, similar to plate 114, is held in the slides or guideways 169 and 170, to thus be freely and readily removable. The air circulating plate 171, carried by plate 168, is inclined downwardly and is so sloped with respect to the wall member 168 that the air circulation space is wider at the top or intake end, than at the bottom or discharge end. With this structure, the use is substantially the same as set forth in connection with the disclosure in Fig. 15, although the circulation of air and the rate of flow may vary.

Figure 27:
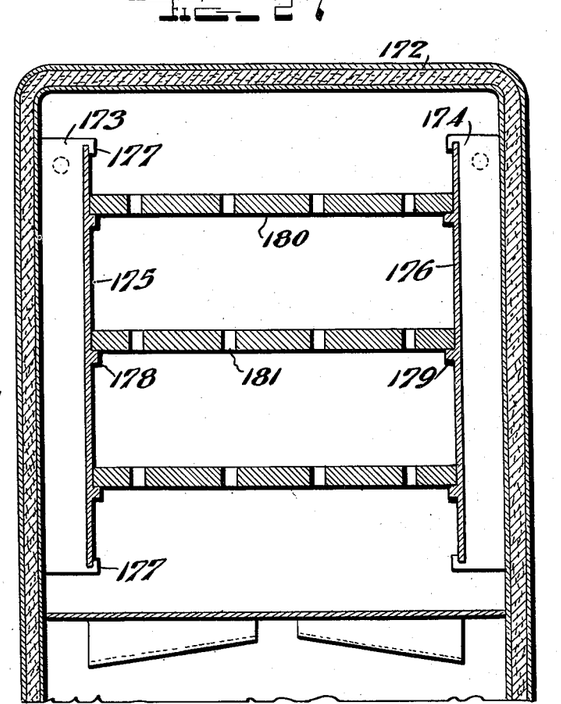
Fig. 27 is a view similar to Fig. 25 illustrating another adaptation.

In some instances, as where it is desired to quickly chill or freeze considerable quantities of material, the modified structure disclosed in Fig. 27 may be employed. The cabinet or container structure 172 has the heat exchange members or structures 173 and 174 on opposite sides thereof, and these heat exchange structures can be evaporators or other heat exchange members such as might ordinarily be employed in compression or absorption types of refrigerator systems, or can be fluid containers having coils therein, similar to the showing in Fig. 15, or in fact can be of any ordinary or special type as may be desired. The heat exchange structures 173 and 174 have the outer or exposed sides thereof substantially flat and heat exchange plates 175 and 176 are placed and held in flatwise arrangement and disposition upon and against these inner sides of the structures 173 and 174. By provision of guides or trackways 177 and 178, the heat exchange plates 175 and 176 can be readily fitted and held in place, and can be removed with equal facility when it is desired to defrost or clean these plates. The plates 175 and 176 have shelf supporting lugs or rails 178 and 179 thereon, and shelves 180 are provided to rest and be carried upon these supports. It is perhaps preferable that these shelves 180 be made of aluminum, or of other material having high heat exchange properties, and that they be made relatively thick to thus present a considerable mass of material and be of sufficient width to contact and bear at their edges against the heat exchange plates 175 and 176. Shelves 180 can be made solid to stop air circulation, or can be provided with openings 181, or can be made otherwise reticulated, to permit and perhaps to direct circulation of air.

Figure 28:
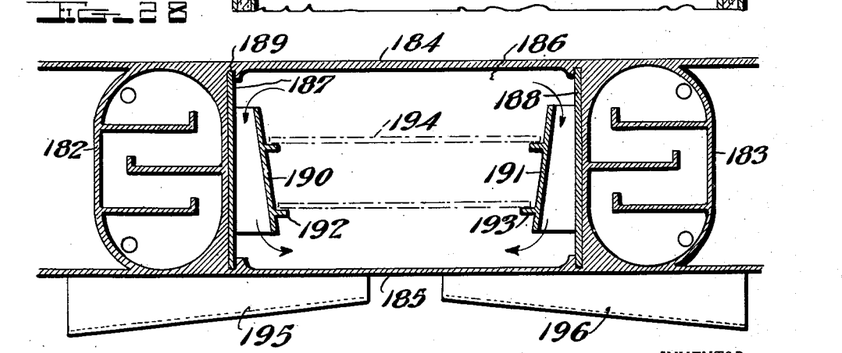
Fig. 28 is a fragmentary vertical sectional view showing embodiment of my invention with a freezing unit as disclosed in Figs. 8 and 9.

With the modification illustrated in Fig. 28, freezing units or evaporators 182 and 183, similar to the freezing or evaporator unit shown in Figs. 8 and 9, are employed, and as here illustrated, the top and bottom plates 184 and 185 cooperate with adjacent side walls of the freezing units or evaporators 182 and 183 to form a compartment 186. Heat exchange plates 187 and 188 are removably mounted in suitable grooves or guideways 189 and carry air circulation directing plates 190 and 191. These air circulation plates can be provided with supporting rests 192 and 193 so that shelves can be mounted within the compartment or space 186, the approximate position of a shelf being indicated at 194. With this construction and adaptation, the lower wall 185 may be the top of and may constitute a heat exchange wall for a food storage compartment, and one or more inclined air circulation plates 195 and 196 can be employed to direct and stimulate circulation of air adjacent to the lower side of the wall 185, thus functioning as a heat exchange wall. With this adaptation, refrigerant may be flowed over the baffle plates of the freezing units or evaporators 182 and 183, after the manner set forth in connection with the structure illustrated in Figs. 8 and 9, and this structure thus particularly well adapts itself for use with an absorption type of refrigerator.

With the adaptation illustrated in Fig. 11, and the other forms and constructions as herein disclosed, it may be possible to provide a conversion unit or conversion structure to be applied or mounted and used with and as an accessory to mechanical and absorption types of refrigerators already in use. Where such an installation or adaptation or embodiment is made, the guideways and the heat exchange wall can be made to be mounted within refrigerator cabinets of standard forms and constructions, and it will be found that in many, or most, instances, the evaporator or other heat exchange structure and the refrigeration unit or mechanism generally, can be set up or adjusted to function to give the desired low temperature in the upper compartment or space.

With the adaptations disclosed in Figs. 14 and 15, I have perhaps stressed the employment of heat exchange structure on opposite sides within the cabinet, but it will be understood and appreciated that heat exchange or heat absorption structures or parts can be employed on the front and back, as well as the top or bottom, in addition to the sides, and in fact many variations can be made in this respect to suit different requirements and conditions of use.

From the foregoing it will be seen that I have provided a refrigeratnig system and apparatus that can be employed in many types and styles and sizes of refrigerators and refrigerating equipments, and that provsiion is made for efficient and economical carrying out of the objects and purposes of my invention.

While I have herein shown and described only certain specific embodiments and adaptations, and have set forth and suggested only certain possible modifications, it will be appreciated that many changes can be made in the form, construction, arrangement, assembly, and association of the parts and structures, and in the manner of installation and use, without departing from the spirit and scope of my invention.

I claim:

1. A refrigerator apparatus including a refrigerating cabinet, a transverse baffle wall dividing said cabinet into upper freezing and lower storage compartments, an elongated evaporating unit extending across the upper compartment in spaced relation from said transverse baffle, and freezing container supporting means interposed between said evaporating unit and the transverse baffle, said supporting means having edge portions and a commodity supporting portion surrounded thereby and being arranged within said upper freezing compartment with said commodity supporting portion out of contact with said baffle and said elongated evaporating unit.

2. A refrigerating apparatus including an insulated cabinet, a sloping baffle wall disposed in transverse relation within and below the top of the cabinet and dividing said cabinet into upper freezing and lower storage compartments, a refrigerating unit disposed in the upper compartment and spaced above the transverse baffle, supporting means interposed between said unit and transverse baffle having edge portions and a commodity supporting portion surrounded thereby, said means being arranged within said upper freezing compartment with said commodity supporting portion out of contact with said baffle and said refrigerating unit, and containers mounted on said supporting means to receive and hold material to be frozen.

3. In a mechanical refrigerator a food freezing compartment and a food storage compartment thereblow formed by confining walls on four sides, an evaporator-ice mold tray assembly arranged to provide a clearly defined wall or ceiling for said compartment and a base or lower boundary formed by a baffle arrangement which baffle arrangement maintains the low temperature induced within the said food freezing storage compartment by the evaporator assembly, and supporting means having edge portions and a commodity supporting portion surrounded thereby, said means being arranged within said food freezing compartment with said commodity supporting portion out of contact with said baffle and said ceiling.

4. A refrigerating apparatus including an insulated cabinet, a sloping baffle wall disposed in transverse relation within and below the top of the cabinet and dividing said cabinet into upper freezing and lower storage compartments, an elongated evaporating unit extending across the upper compartment and spaced above the transverse baffle, and supporting means interposed between said evaporating unit and transverse baffle, said supporting means having edge portions and a commodity supporting portion surrounded thereby and being arranged within said food freezing compartment with said commodity supporting portion out of contact with said baffle and said ceiling.

5. A refrigerating apparatus comprising, an insulated cabinet, a transverse baffle wall dividing said cabinet into upper and lower compartments, a refrigerating unit disposed above said baffle wall and comprising a plurality of spaced evaporator elements having therebetween a plurality of ice mold tray compartments, and rack structure below said refrigerating unit in the upper compartment to support food containers.

6. A refrigerating apparatus comprising, an insulated cabinet, a baffle wall disposed in transverse relation within said cabinet and dividing the cabinet into upper freezing and lower storage compartments, an evaporator ice mold assembly having a plurality of evaporator elements spaced in horizontal alignment, and platelike members associated with said evaporator elements at top and bottom to form a plurality of horizontally spaced ice mold tray compartments.

7. A refrigerating apparatus comprising, a cabinet, and an evaporator ice mold tray assembly in said cabinet comprising a plurality of evaporator elements arranged in horizontally spaced alignment and having plate-like elements associated therewith disposed in transverse relation at top and bottom to define a plurality of laterally spaced ice mold tray compartments in which the intermediate evaporator elements serve laterally on their opposite sides to define adjacent ice mold tray compartments.

8. A refrigerating and ice mold tray assembly comprising, a plurality of refrigerating elements arranged in laterally spaced alignment, and top and bottom members associated with and extending over a plurality of said refrigerating elements to provide a plurality of laterally spaced and aligned ice mold tray compartments in which the refrigerating elements serve as lateral and separating walls.

9. A refrigerating apparatus comprising, an insulated cabinet, a baffle wall disposed in transverse relation within said cabinet and dividing the cabinet into upper and lower compartments, an evaporator ice mold assembly having a plurality of evaporator elements spaced in horizontal alignment, plate-like members associated with said evaporator elements at top and bottom to form a plurality of horizontally spaced ice mold tray compartments, and supporting rack portions in the space intermediate the transverse baffle and the evaporator ice mold tray assembly to support food containers.

10. A refrigerating apparatus comprising, an insulated cabinet, a baffle structure including a sloping wall disposed within the cabinet and dividing said cabinet into upper freezing and lower storage compartments, a combined refrigerating and ice mold tray assembly located within the cabinet and spaced above the transverse baffle, and supporting means intermediate the refrigerating ice mold tray assembly and the sloping plate of the baffle, said supporting means having edge portions and a commodity supporting portion surrounded thereby and being arranged within said upper freezing compartment with said commodity supporting portion out of contact with said baffle and said combined refrigerating and ice mold tray assembly.

11. A refrigerating apparatus comprising, an insulated cabinet, a transverse baffle structure disposed within the cabinet and dividing said cabinet into upper freezing and lower storage compartments, a combined refrigerating and ice mold tray assembly located within the cabinet and spaced above the transverse baffle, and supporting structure intermediate the refrigerating ice mold tray assembly and the baffle, said supporting structure having edge portions and a commodity supporting portion surrounded thereby and being arranged within said freezing compartment with said commodity supporting out of contact with said baffle structure and said ice mold tray assembly.

12. In a general food storage refrigerator, a baffle structure in the upper portion of said refrigerator formed by two substantially L-shaped pieces, a food freezing compartment at the top of said refrigerator, the walls of said food freezing compartment being formed by a combination of two vertical walls of the refrigerator and two vertical portions of the baffles, the bottom of said food freezing compartment being formed by two substantially horizontal portions of the baffles, and the top of said food freezing compartment being bound by an imperforate evaporator-ice mold tray assembly, said assembly being positioned between the walls of the food freezing compartment but spaced from said walls to provide vents, the food freezing compartment having a rack or racks in the lower portion thereof to support food containers.

13. In a general food storage refrigerator, a baffle structure in the upper portion of said refrigerator formed by two substantially L shaped pieces, this baffle structure separating the food storage area into two sections, the upper section having therein evaporator ice freezing elements extending across the upper part of said upper section, a substantial space between the evaporator ice freezing element and the L-shaped baffles for the storage of food and racks in said space for supporting food containers, and the lower section of the storage area, so separated by the baffle structure from the upper or low temperature storage compartment, forming a food storage compartment for the maintenance of higher temperatures suitable to ordinary food storage refrigeration.

14. In a general food storage refrigerator, a baffle structure in the upper portion of said refrigerator formed by two substantially L-shaped pieces, said baffle structure separating the food storage area into two sections, the upper section having therein an evaporator ice freezing unit extending across the upper part of said upper section and leaving a substantial space between the evaporator ice freezing unit and the L-shaped baffles for the support of food, and racks in said space for supporting food; and the lower section of the storage area being separated by the baffle structure from the upper section and forming a food storage compartment for the maintenance of higher temperatures suitable to ordinary food storage refrigeration.

15. A refrigerator apparatus comprising, a refrigerating cabinet, a transverse baffle wall dividing said cabinet into upper freezing and lower storage compartments, heat absorption means in the upper freezing compartment in spaced relation from said transverse wall, and supporting means interposed between said heat absorption means and said transverse wall having edge portions and a commodity supporting portion surrounded thereby, said means being arranged within said upper freezing compartment with said commodity supporting portion out of contact with said heat absorption means and said transverse wall.

JAMES G. SCOTT.